United States Patent Office 3,018,258
Patented Jan. 23, 1962

3,018,258
NEW CURING AGENTS FOR POLYEPOXIDES
AND METHOD FOR THEIR PREPARATION
Dale J. Meier and Allan Kahn, El Cerrito, Calif., assignors to Shell Oil Company, a corporation of Delaware
No Drawing. Filed Jan. 19, 1959, Ser. No. 787,391
20 Claims. (Cl. 260—6)

This invention relates to a new class of materials that are particularly useful as curing agents for polyepoxides. More particularly, the invention relates to new materials that act as latent curing agents for polyepoxides, to their preparation and use, particularly in the preparation of coatings and castings.

Specifically, the invention provides new and particularly useful latent curing agents for polyepoxides that have the special property of being substantially unreactive with polyepoxides at normal temperatures and atmospheric conditions, but readily react with the polyepoxides when the combined mixture is heated. These new curing agents comprise small particles of a material normally reactive with polyepoxides, such as amines, acids, anhydrides, mercaptans, salts and the like, which are encapsulated or covered with a coating of a hardened inactive protective colloid, such as gelatin. The invention further provides a method for preparing the new curing agents.

As a special embodiment, the invention provides a process for curing polyepoxides which comprises mixing the above-noted latent curing agents with the polyepoxide and heating the combined mixture to a temperature above about 60° C.

Polyepoxides, such as, for example, those obtained by reacting epichlorohydrin with polyhydric phenols in the presence of caustic, are promising materials for use in many industrial applications as they can be reacted with curing agents to form insoluble infusible products having good chemical resistance. The conventional polyepoxide-curing agent systems, however, have a defect which greatly limits the industrial use of the polyepoxides. The mixtures containing the polyepoxide and curing agent set up rather rapidly to form the hard insoluble product. This necessitates a mixing of the components just before use and then a rapid use of the material before cure sets in. Such a procedure places a considerable burden on the individual operators and in many cases gives inferior products resulting from inefficient mixing and too rapid working up operations.

It is an object of the invention, therefore, to provide a new class of curing agents for polyepoxides. It is a further object to provide new curing agents for polyepoxides that are substantially unreactive with the polyepoxide under normal temperatures and atmospheric conditions. It is a further object to provide new curing agents that can be premixed with the polyepoxides and the mixture stored without danger of cure during storage. It is a further object to provide new curing agents for polyepoxides that react with the polyepoxides only on heating for a considerable period of time. It is a further object to provide a new process for curing polyepoxides that is particularly useful for preparing baked coatings, castings and pottings. These and other objects of the invention will be apparent from the following detailed description thereof.

It has now been discovered that these and other objects may be accomplished by the new curing agents of the invention comprising small particles of a material normally reactive with polyepoxides, such as amines, acids, anhydrides, mercaptans, salts and the like, which are encapsulated or covered with a coating of a hardened inactive protective colloid, such as gelatin. It has been surprisingly found that when these coated particles are combined with polyepoxides they are unreactive therewith and the mixture can be stored for long periods of time without any curing of the polyepoxides. When the mixture is heated for some time, however, the curing agent becomes active and the polyepoxide sets up rapidly to form the desired insoluble infusible product. The inert protective colloid remaining in the mixture after the application of heat acts as a filler for the cured product and has no noticeable detrimental effect on the ultimate properties of the product. These new curing agents thus provide a means for premixing the curing agent and polyepoxide at the factory and eliminating the special mixing by the operator. This not only results in more thorough mixing and better products, but a reduction in cost of operations for the final user.

As noted hereinafter, the curing agents of the present invention are particularly useful for preparation of molding powders and in the preparation of baked coatings by the new fluidized bed technique as noted hereinafter.

The material to be encapsulated with the protective colloid may be any material that reacts with epoxy groups. This includes the amines, amino-containing polyamides, acids, acid anhydrides, salts, mercaptans, hydrazines, $BF_3$-complexes, and the like, and mixtures thereof. Examples of such materials include, among others, p-phenylene diamine, diaminodiphenylsulfone, p,p'-methylene dianiline, p,p-diaminodiphenylmethane, triaminobenzene, 2,4-diaminotoluene, tetraaminobenzene, 3,3'-diamino diphenyl, 1,3-diamino-4-isopropylbenzene 1,3-diamino-4,5-diethylbenzene, diaminostilbene, triethylamine, ethylene diamine, diethylamine, diethylene triamine, triethylene tetramine, tetraethylene pentamine, pyridine, diaminopyridine, piperidine, N,N'-diethyl-1,3-propane-diamine, dicyandiamide, melamine, fatty acid salts of amines, such as the 2-ethylhexoate of tris(dimethylaminomethyl)phenol, adducts of polyepoxides, such as those described hereinafter, and the above-described mono- and polyamines, as the adduct of p-phenylene diamine and styrene oxide, the adduct of p-phenylene diamine and allyl glycidyl ether, the adduct of diglycidyl ether of 2,2-bis(4-hydroxyphenyl)propane and diethylene triamine, the adduct of diethylene triamine and ethylene oxide, the adduct of diethylene triamine and styrene oxide, the adducts of polyamines and unsaturated nitriles, such as the adduct of diethylene triamine and acrylonitrile, the adduct of diethylene triamine and unsaturated sulfolanes, and the adduct of p-phenylene diamine and acrylonitrile.

Other examples include the amino-containing polyamides as described in U.S. Patent No. 2,450,940 and the monomeric amides described in U.S. Patent No. 2,832,799.

Other examples include the acid anhydrides, such as phthalic anhydride, succinic anhydride, dodecenylsuccinic anhydride, maleic anhydride, tetrahydrophthalic anhydride, pyromellitic anhydride, hexachlorophthalic anhydride, methyl Nadic anhydride, anhydrides obtained by reacting maleic anhydride with unsaturated compounds, such as oils, terpinene, long chain unsaturated acids and the like, as well as anhydrides obtained by reacting long chain acids with acetic anhydride, and the like.

Still other examples include the salts, such as magnesium perchlorate, zinc fluoborate, potassium persulfate, copper fluoborate, cupric arsenate, zinc persulfate, cupric fluosilicate, cupric iodate, cupric sulfate, magnesium nitrate, magnesium phosphate, stannic fluoborate, zinc nitrate, and the like, as well as the chloride derivatives as aluminum chloride, zinc chloride, ferric chloride and the like.

Still other examples include the acids and acid esters both of organic and inorganic acids, as the sulfonic acids and their salts as noted in U.S. 2,687,397 and U.S. 2,643,243 and U.S. 2,631,138, phosphoric acid esters as described in U.S. 2,541,027, oxalic acid as in U.S. 2,500,449, long chain acids as adipic acid, succinic acid, acids obtained by polymerizing unsaturated acids as the long chain fatty acids as linoleic acid, soybean oil fatty acids, acids obtained by polymerizing unsaturated acids as acrylic acid with themselves or with other materials, such as butadiene, styrene, acrylonitrile and the like, and acid-containing polyesters such as obtained by reacting polycarboxylic acids, as phthalic acid, terephthalic acid and the like, with a deficient amount of a polyhydric alcohol as ethylene glycol, propylene glycol and the like.

Still other examples include the $BF_3$ adducts with various materials, such as amines, amides, ethers, phenols and the like. Examples of such adducts are disclosed in U.S. 2,824,083.

Still other examples include the polymercaptans, such as 1,5-pentanedithiol, 1,4-cyclohexanedithiol, dimercapto diethylformal, 3,3'-thiodipropanethiol, 4,6-disulfonyl-1,8-octanedithiol, 1,3-benzenedithiol, tetrahydropyran-2,3-dipropanethiol, furan-2,5-dibutanethiol, and the polymeric polythiols, such as the polythiopolymercaptans obtained by treating polymercaptans as noted above with agents, such as hydrogen peroxide. Polymers of the formula $HS(C_2H_4OCH_2OC_2H_4SS)_nC_2H_4OCH_2OC_2H_4SH$ may be obtained by reacting dimercapto diethyl formal with hydrogen peroxide. A more detailed description of preparing such polymers may be found in Patrick, U.S. 2,466,963.

Particularly preferred materials to be used include the above-described aromatic and aliphatic polyamines, aromatic and aliphatic polycarboxylic acids, aromatic and aliphatic acid anhydrides, and the aromatic and aliphatic polymercaptans, each of which preferably contain from 2 to 25 carbon atoms.

The new curing agents of the invention are obtained by converting the above-described materials into small particles covered or encapsulated with a hardened inactive protective colloid. The material to be used as the encapsulating agent may be any inactive protective colloid. By "inactive" is meant one that does not contain groups which would react under normal temperatures, e.g., 20 to 50° C., with epoxy groups. Examples of such materials include, among others, gelatin, agar, methylcellulose, starch, starch degradation products, such as dextrine, vinyl polymers, such as polyvinyl alcohols, polyvinyl acetals as obtained by reacting the polyvinyl alcohols with aldehydes, and the like, and mixtures thereof. Gelatin is particularly preferred material to be utilized. The polyvinyl alcohols subsequently hardened with formaldehyde are also very useful materials for encapsulation.

The protective colloid may be employed in a hardened form (e.g., polyvinyl formals), or the colloid may be one that gives a soft coating which can be hardened by subsequent treatment. Hardening agents that can be used for this subsequent treatment include, among others, formaldehyde and materials that engender formaldehyde, weak acids and the like, and mixtures thereof.

The encapsulation of the above-described materials reactive with epoxy groups can be accomplished in a variety of ways. For example, the material reactive with epoxy groups and the protective colloid material may be combined with a suitable solvent, the solvent evaporated and the resulting product ground to form the desired powder.

Another suitable method for those materials which are insoluble in water is to add the material reactive with epoxy groups alone or in an organic solvent to a water solution containing the protective colloid, such as, for example, gelatin, and then stir the mixture rapidly to effect a coating of the water insoluble material with the protective colloid. The particles are then precipitated and a hardening agent added to harden the protective colloid layer if it is not already in the hardened form.

A related method for those materials reactive with epoxy groups which are soluble in water, but insoluble in organic solvents is to add the material alone or in a water solution to a solvent solution containing a protective colloid, such as the polyvinyl resin type materials, and then stirring the mixture rapidly to effect a coating of the water soluble material with the protective colloid. The particles are then precipitated and a hardening agent then added to harden the protective colloid layer if it is not already in the hardened form.

The solutions of the protective colloid materials to be used in the above-described processes may be of any concentration, but preferably the concentrations vary from about 5% to about 30%, and more preferably, between 5% and 20%.

The ratio of the amount of the material to be encapsulated to the amount of protective colloid to be used in the formation of the particles may vary. In most cases, it is preferred to employ about 1 to 5 parts of the protective colloid material per 20 parts of the material to be encapsulated.

The amount of stirring needed to effect a coating of the material reactive with epoxy groups with the protective colloid will vary depending upon the nature of the material and the protective colloid solution as well as the size of the particles desired. For most applications, particle sizes varying from about 1 to 20 microns are desired. Larger or smaller particles may be prepared, however, as desired or necessary. To obtain particles of this size with the general type of material and protective colloid solution, stirring at the rate of about 30 to 200 r.p.m. will generally be satisfactory.

The formation of the coated particles as noted above may be accomplished at any suitable temperature. Temperatures generally range from about 20° C. to 80° C. However, higher or lower temperatures may be employed as needed.

Once the particles have been formed and coated with the encapsulating material, the particles may be precipitated. This may be accomplished by any suitable means such as the addition of salts as alum and sodium sulfate or by addition of alcohols, acids and the like.

A hardening agent is then added to convert the protective colloid layer into a hardened material. This is preferably accomplished by adding an aqueous or solvent solution of the agent (e.g., 10% to 50% solution) to the solution in which the particles have been formed and then allowing the combined mixture to stand for a short period. Heat may be applied if desired to accelerate the hardening process.

After the hardening has been accomplished, the particles may be removed from solution by conventional technique, such as, for example, by filtration or centrifugation. The particles may then be washed and dried.

The curing agents of the invention prepared as noted above are small solid-like particles. The particles are generally insoluble in solvent and in liquid polyepoxides as noted below. The particles have a smooth tough outer covering and may be stored or shipped at temperatures below the melting or decomposition temperature of the protective colloid without danger of changing shape or becoming sticky.

In using the above-noted particles as curing agents for polyepoxides, it is only necessary to mix them with the polyepoxide and heat the application to effect release of the bound curing agent. The exact temperature employed in the cure will vary depending on the nature of the inert protective colloid. Preferred temperatures range from about 50° C. to about 200° C., and still more preferably, between 70° C. and 150° C.

The amount of the new curing agents employed will also vary over a wide range. The amount of the curing agents having active hydrogen as well as the agents such as acid anhydrides are preferably employed so as to furnish at least .6 equivalent, and still more preferably, .8 to 1.5 equivalents per equivalent of the polyepoxide. As used herein in relation to the amount of curing agent, "equivalent" means that amount needed to furnish 1 active hydrogen or anhydride group per epoxy group. The other curing agents, such as metal salts, tertiary amines, BF₃, and the like are preferably used in amounts varying from about .1% to 6% by weight of the material being cured.

In calculating the exact amount of the curing agent to be used, one should, of course, note that a portion of the weight of the curing agent particles is the inert coating, and one should allow for that exact weight in making the final determination.

It is preferred in most cases to just mix the curing particles with the polyepoxide without the aid of any diluent or solvent. If the polyepoxide is itself a solid, the resulting mixture of solids could be used as an ideal molding powder. If the polyepoxide is a solid and the mixture is to be used as a coating or in a liquid form, added diluents and solvents may be employed. If solvent selected is also a solvent for the protective colloid material, it should be added near the time the cure is to be effected.

Various solvents that are suitable for achieving fluidity of the polyepoxide mixtures include, among others, ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benze, toluene, xylene, etc., and/or alcohols such as ethyl, isopropyl or n-butyl alcohol. Solvents which remain in the cured compositions may also be used, such as diethyl phthalate or liquid monoepoxy compounds including glycidyl allyl ether, glycidyl phenyl ether, styrene oxide, and the like, as well as cyano-substituted hydrocarbons, such as acetonitrile. It is also convenient to employ a glycidyl polyether of the dihydric phenol in admixture with a normally liquid glycidyl polyether of a polyhydric alcohol.

The above-described novel curing agents of the invention may also be used in combination with other curing agents, such as aliphatic polyamines, polycarboxylic acids and anhydrides, BF₃ and its complexes, metal salts and the like, to effect special curing techniques.

One important application of the new curing agent is the production of molding powders. In this case, the curing agent particles are mixed with the solid polyepoxide and any other materials, such as fillers, stabilizers, etc. and this mixture ground together as a fine powder. This powder may then be used in molding machines, such as those for compression molding or transfer molding. If desired, the powder may be prepared in preform pellets before use.

The new curing agents are also particularly useful in the coating of articles by the new fluidized bed technique. In this application, the powdered curing agent is mixed with solid particles of the polyepoxide and placed in the fluidized bed receptacle. Air is forced in through holes in the bottom of the receptacle so as to form a fluid bed of the particles. The article to be coated is heated and dipped into the fluid bed. The article which is then coated with the particle is removed and placed in a baking oven to effect the cure.

Another important application of the new curing agents is the preparation of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like.

In this operation, the solid curing particles may be added to a solvent solution of the polyepoxide, and the sheets of fibrous material then impregnated with the mixture as by spreading or by dipping or other known techniques. The solvent is conveniently removed by evaporation and the mixture is cured by the application of heat and application of pressure. In most cases, it is preferred to superimpose a series of layers of the treated cloth before cure in order to form the multilayer laminate having the desired strength.

Other important uses include that of adhesives and as coating or impregnating compositions. In these applications, the polyepoxide, special curing agent and other desired materials, such as plasticizers, stabilizers, extender resins and the like are combined together in a suitable diluent or solvent and the mixture applied to the desired surface, such as concrete, asphalt, steel, wood, plaster, stone and the like, and then allowed to set.

The polyepoxides to be used in the process of the invention include those organic compounds containing a plurality of epoxy groups, i.e.,

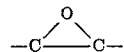

groups. These compounds may be saturated or unsaturated, aliphatic, cycaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type are described in terms of epoxy equivalent value. The meaning of this expression is described in U.S. 2,633,458.

Various examples of polyepoxides that may be used in the process of the invention are given in U.S. 2,633,458 and it is to be understood that so much of the disclosure of that patent relative to examples of polyepoxides is incorporated by reference into this specification.

Other examples include epoxidized esters of polyethylenically unsaturated monocarboxylic acids, such as epoxidized linseed, soybean, perilla, oiticia, tung, walnut and dehydrated castor oil, methyllinoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed, and the like.

Another group of polyepoxides useful in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyheptyl) succinate, di(2,3-epoxybutyl) maleate, di(2,3-epoxyoctyl) pimelate, di(2,3-epoxypropyl) phthalate, di(2,3-epoxycyclohexyl) adipate, di(2,3-epoxypentyl) thiodipropionate, di(5,6-epoxytetradecyl) diphenyldicarboxylate, di(3,4-epoxyheptyl) sulfonyldibutyrate, tri(2,3-epoxypropyl) 1,2,4-butanetricarboxylate, di(5,6-epoxypentadecyl) tartarate, di(4,5-epoxytetradecyl) maleate, di(3,4-epoxybutyl) citrate, and di(4,5-epoxyoctadecyl) malonate. Preferred members of this group comprise the glycidyl esters, such as the glycidyl esters of the dicarboxylic acids preferably containing from 2 to 18 carbon atoms, such as diglycidyl phthalate, diglycidyl maleate, diglycidyl adipate, diglycidyl sebacate, diglycidyl cyclohexanedicarboxylate and the like.

Another group of the polyepoxides include the epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4-epoxycyclohexyl 3,4 - epoxycyclohexanoate, 3,4 - epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeiconsanedioate, dibutyl 7,8,11, 12-diepoxyoctadecanedioate, dioctyl 10,11-diethyl-8,9,12, 13-diepoxy-eiconsanedioate, dihexyl 6,7,10,11-diepoxyhexanedecanedioate, didecyl 9-epoxy-ethyl-10,11-epoxyocta-decenedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprise the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (hycar rubbers), butadienestyrene copolymers and the like.

The advantages of the present invention can also be obtained by using the reverse technique, i.e., by encapsulating the polyepoxide with the above-described encapsulating material, and leaving the curing agent without encapsulation. This may be more desirable if the polyepoxide is a solid or semi-solid material and relatively water insoluble. In using this technique, the above encapsulating procedure may be followed with the exception of putting the polyepoxide in place of the curing agent.

To illustrate the manner in which the invention may be carried out, the following examples are given. It is to be understood, however, that the examples are for the purpose of illustration and the invention is not to be regarded as limited to any of the specific materials or conditions recited therein. Polyether A, B and C referred to herein are those described in U.S. 2,633,458.

Example I

This example illustrates the preparation of a new latent curing agent from p,p'-methylenedianiline and gelatin.

Five parts of gelatin was dissolved in 45 parts of water at 50° C. 10 parts of p,p'-methylenedianiline was dissolved in 10 parts of tetrahydrofuran and this mixture stirred into the aqueous gelatin solution. An emulsion was formed immediately. 25 parts of 20% sodium sulfate was then added to the solution to coagulate the gelatin. 100 parts of 37% formaldehyde was then added and the mixture allowed to stand overnight. The particles were filtered, washed and dried in vacuum at room temperature.

The final product was a hard brittle material that could readily be crushed to a powder.

5.2 parts of polyether A was combined with 2.1 parts of the encapsulated p,p-methylenedianiline prepared as above and the mixture allowed to stand. There was no evidence or cure for over two months period.

The above mixture was then heated in an oven at 160° C. for a number of hours. At the end of that period, the mixture had set up to a hard strong casting.

Example II

This example illustrates the preparation of a latent curing agent from p,p'-methylenedianiline and polyvinyl alcohol.

1 part of polyvinyl alcohol was dissolved in 100 parts of water. 10 parts of p,p'-methylenedianiline was dissolved in 10 parts of tetrahydrofuran, and this mixture added to the gelatin solution. An emulsion was formed immediately. 5 parts of formaldehyde was added. The mixture was filtered and dried in vacuo. The product was crushed to a fine powder.

2.8 parts of the above product was combined with 10 parts of polyether A and the mixture allowed to stand at room temperature. No gelatin was noticed in the mixture.

A related composition containing the encapsulated product and polyether A was heated to 100° C. for 2 hours. The resulting product was a hard insoluble resin.

Example III

This example illustrates the preparation of a new latent curing agent as in Example I with the exception that alum is used to precipitate the particles from solution.

2.5 parts of gelatin was dissolved in 250 parts of water. 50 parts of methylene dianiline was dissolved in 50 parts of tetrahydrofuran and this added to the above solution. The mixture was stirred and then 25 parts of a solution of $KAl(SO_4)_2$ (prepared from 22.8 parts of the aforementioned salt in 200 parts of water) were added to precipitate the encapsulated curing agent.

The above material was then filtered and washed and placed in a vacuum to dry. 5 parts of polyether A was combined with 2.5 parts of the resulting solid particles and the mixture allowed to stand at room temperature for several weeks. No cure was noticed. A related mixture of the particles and polyether A was placed in an oven and heated at 100° C. for several hours. The resulting product is a hard solid acetone insoluble casting.

Example IV

This example illustrates the preparation of a latent curing agent from an amino-containing polyamide of diethylenetriamine and dimerized soybean oil fatty acid (Versamid 125) and gelatin.

5 parts of gelatin was dissolved in 100 parts of water. To this was added 6.8 parts of Versamid 127. The mixture was stirred rapidly with a motor driven stirrer to put the Versamid 127 in suspension. The particles were coagulated by means of 10 parts of alum and then hardened with 37% formaldehyde solution. The resulting product was cut and ground into fine powder.

5 parts of polyether A was combined with 2.5 parts of the powdered curing agent and the mixture allowed to stand at room temperature. The mixture remained stable for over one month at this temperature. When the mixture was heated at 100° C. the product set up to a hard solid casting.

Example V

This example illustrates the preparation of a molding powder from the encapsulated curing agent disclosed in Example I.

5 parts of glycidyl ether of tetrakis(hydroxyphenyl)-ethane was combined with 1.4 parts of the encapsulated methylenedianiline curing agent and 6.4 parts of titanium dioxide. This mixture was molded at 195° C. under 2000 p.s.i. pressure. The resulting casting was a hard product having a Barcol hardness of 60–65%.

Example VI 5 parts of gelatin was added to 100 parts of water. 10.3 parts of Duomeen S was dissolved in tetrahydrofuran and the mixture added to the water solution of gelatin. 32.5 parts of sodium sulfate solution was then added to precipitate the particles. The resulting solution was then combined with 50 parts of 37% formaldehyde solution.

The particles were then filtered, washed and dried in vacuum.

5 parts of polyether A was combined with 2.5 parts of the particles produced above and the mixture heated at 100° C. for 2 hours. The mixture set up to form a hard solid. A similar solution had not set up after 4 days at room temperature. The unencapsulated curing agent will cure the polyether A overnight.

Example VII

This example illustrates the preparation of a latent curing agent using metaphenylene diamine and Formvar, i.e., polyvinyl alcohol-acetal product.

1.4 parts of Formvar was dissolved in 44 parts of tetrahydrofuran as a solvent. 1.4 parts of meta-phenylene diamine was added thereto and the components blended together by stirring. The solution was then evaporated leaving a brownish precipitate. The precipitate was ground up as a fine powder.

Parts of the above product was combined with 10 parts of polyether A and the mixture heated for 2 hours at 102° C. The product was a hard solid. A related mixture allowed to stand at room temperature did not cure even after several months.

The above experiment was repeated with the exception that metaphenylene diamine is replaced by methylenedianiline. Related results are obtained.

We claim as our invention:

1. A new curing agent for liquid polyepoxides possessing a plurality of

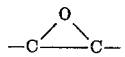

group comprising small particles of material having groups reactive with 1,2-epoxy groups, which particles are encapsulated in a hardened protective colloid material which is insoluble in the polyepoxide and contains no group reactive with epoxy groups at 20° C. to 50° C.

2. A new curing agent for liquid polyepoxides possessing a plurality of

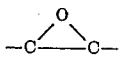

group comprising small particles of a member of the group consisting of polyamines, polycarboxylic acids, polycarboxylic acid anhydrides, metal salts, BF₃ adducts, polymercaptans, and hydrazines, which are encapsulated in a protective colloid which has been subsequently hardened, said hardened protective colloid being insoluble in the polyepoxide and containing no group reactive with epoxy groups at 20° C. to 50° C.

3. A curing agent as in claim 2 wherein the particles are encapsulated in hardened gelatin.

4. A curing agent as in claim 2 wherein the small particles are encapsulated in a vinyl polymer which melts at 60° C. to 200° C.

5. A curing agent as in claim 2 wherein the small particles are encapsulated in a polyvinyl acetal resin which melts at 60° C. to 200° C.

6. A curing agent as in claim 2 wherein the material encapsulated is an aromatic diamine.

7. A curing agent as in claim 2 wherein the material encapsulated is a polycarboxylic acid anhydride.

8. A curing agent as in claim 2 wherein the material encapsulated is a BF₃ adduct.

9. A curing agent as in claim 2 wherein the material encapsulated is methylenedianiline.

10. A new curing agent for liquid polyepoxides comprising small particles of methylenediamine encapsulated in a hardened protective colloid which is insoluble in the polyepoxide and contains no group reactive with epoxy groups at 20° C. to 50° C.

11. A curing agent as in claim 10 wherein the colloid is gelatin.

12. A curing agent for liquid polyepoxides comprising small particles of methaphenylene diamine which have been encapsulated with a hardened protective colloid which is insoluble in the polyepoxide and contains no group reactive with epoxy groups at 20° C. to 50° C.

13. A curing agent for liquid polyepoxides comprising small particles of diaminodiphenylmethane encapsulated in hardened gelatin.

14. A process for curing liquid polyepoxides possessing a plurality of

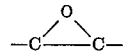

group which comprise mixing and reacting at a temperature between 60° C. and 200° C. the polyepoxide with a curing agent comprising small particles of a material having groups reactive with epoxy groups which are encapsulated in hardened protective colloid which is insoluble in the polyepoxide and contains no group reactive with epoxy groups at 20° C. to 50° C., said curing agent being employed in sufficient amount to furnish at least .6 equivalent of curing agent per equivalent of the polyepoxide.

15. A process as in claim 14 wherein the polyepoxide is a glycidyl polyether of a polyhydric phenol having a 1,2-epoxy equivalency greater than 1.1.

16. A process as in claim 14 wherein the curing agent comprises small particles of methylene diamine encapsulated in hardened gelatin.

17. A process as in claim 14 wherein the curing agent comprises small particles of diethylene triamine encapsulated in paraffin.

18. A process for curing a liquid polyepoxide which comprises mixing and reacting at a temperature between 60 and 200° C. the said liquid polyepoxide with a solid curing agent comprising small particles of a polyamine which had been encapsulated in a hardened colloid which is insoluble in the polyepoxide and contains no group reactive with epoxy groups at 20° C. to 50° C., the said curing agent being employed in sufficient amount to furnish at least .6 equivalent per equivalent of the polyepoxide.

19. A substantially stable composition comprising a liquid polyepoxide having dispersed within it small particles of a liquid polyamine encapsulated in a hardened protective colloid which is insoluble in the polyepoxide and contains no group reactive with epoxy groups at 20° C. to 50° C., the said curing agent being employed in an amount sufficient to furnish at least .6 equivalent per equivalent of polyepoxide.

20. A process for curing a liquid polyepoxide which comprises mixing and reacting at a temperature between 60° C. and 200° C. the said liquid polyepoxide with a solid curing agent comprising small particles of a liquid polyamine reactive with polyepoxides below 200° C., which polyamine has been encapsulated in hardened gelatin, said curing agent being employed in sufficient amount to furnish at least .6 equivalent of the polyamine per equivalent of polyepoxide.

References Cited in the file of this patent

UNITED STATES PATENTS

| | | |
|---|---|---|
| 2,569,920 | Buck et al. | Oct. 2, 1951 |
| 2,580,683 | Kreuger | Jan. 1, 1952 |
| 2,665,266 | Wasserman | Jan. 5, 1954 |
| 2,870,060 | Bryan | Jan. 20, 1959 |

FOREIGN PATENTS

| | | |
|---|---|---|
| 583,471 | Great Britain | Dec. 19, 1946 |

OTHER REFERENCES

Lee et al.: "Epoxy Resins, Their Applications and Technology," McGraw-Hill, New York (1957), pages 48, 101–05, 111–13 and 116–18 relied upon.